D. ELLIOTT.
RIDING CULTIVATOR.
APPLICATION FILED SEPT. 5, 1916.
1,270,802.
Patented July 2, 1918.
2 SHEETS—SHEET 1.
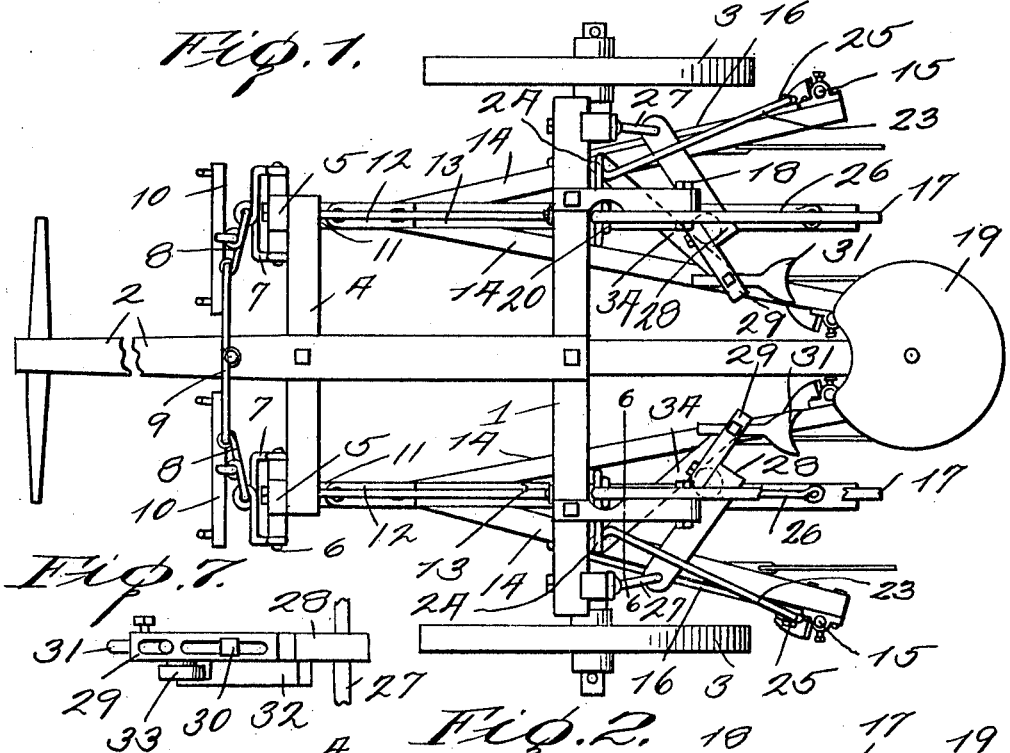
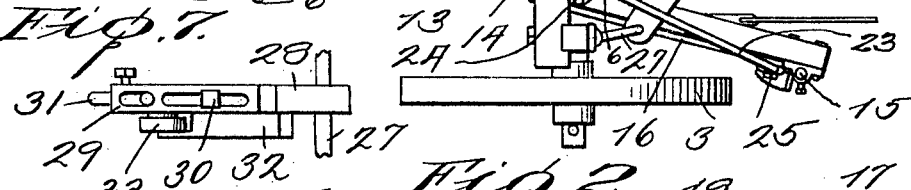
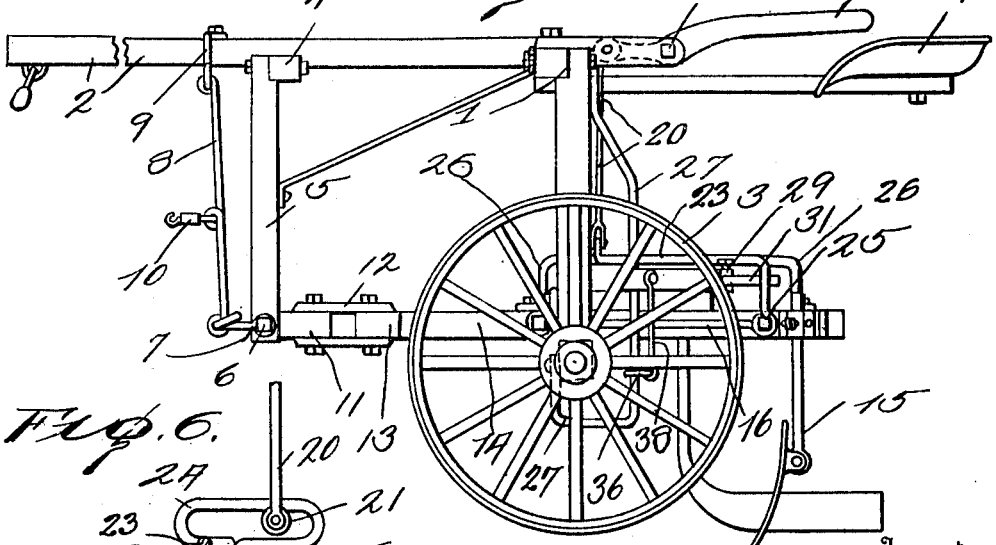
Inventor
D. Elliott
Witnesses
By
Attorneys D. ELLIOTT.
RIDING CULTIVATOR.
APPLICATION FILED SEPT. 5, 1916.
1,270,802.
Patented July 2, 1918.
2 SHEETS—SHEET 2.
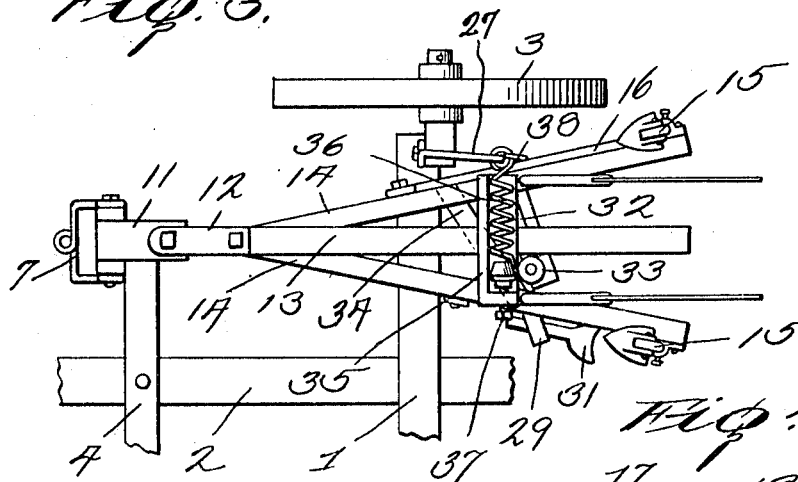
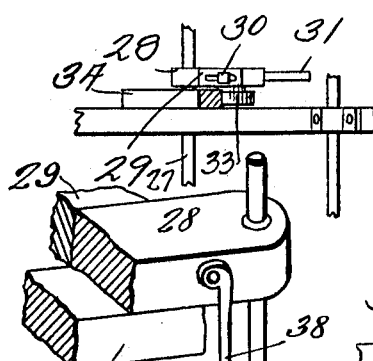
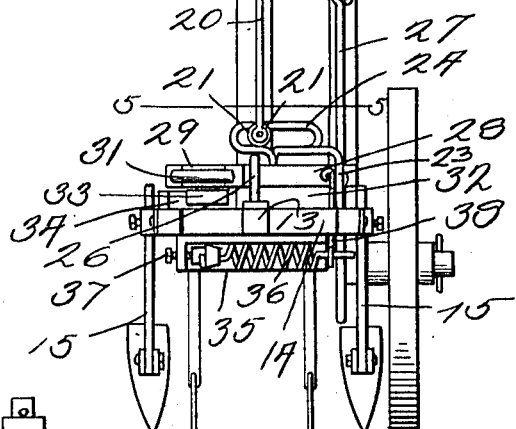
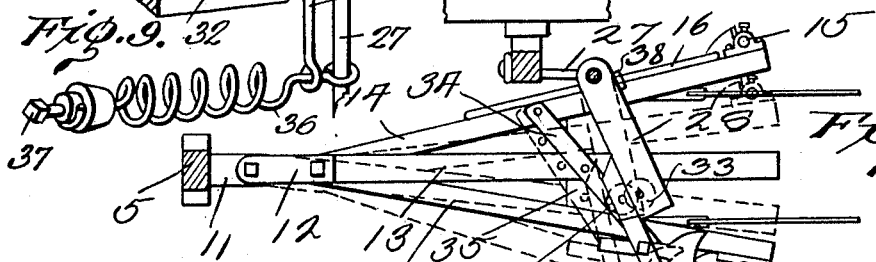

UNITED STATES PATENT OFFICE.

DELBERT ELLIOTT, OF JACKSON, MICHIGAN.

RIDING-CULTIVATOR.

1,270,802.

Specification of Letters Patent.

Patented July 2, 1918.

Application filed September 5, 1916. Serial No. 118,526.

*To all whom it may concern:*

Be it known that I, DELBERT ELLIOTT, a citizen of the United States, residing at Jackson, in the county of Jackson, State of Michigan, have invented certain new and useful Improvements in Riding-Cultivators; and I do hereby declare the following to be a full, clear, and exact description of the invention, such as will enable others skilled in the art to which it appertains to make and use the same.

This invention relates to a riding cultivator.

An object of the invention resides in the provision of an improved structure by means of which the ground may be cultivated on both sides of a row, simultaneously, and in so constructing the device that the sides may be selectively cultivated.

A still further object of the invention resides in the provision of a device of this character which is so constructed that the shovels may be adjusted to and away from the row independently by pedal operating means.

With these and other objects in view, such as will appear as my description progresses, my invention comprises the combination and arrangement of parts as set forth in and falling within the scope of the appended claims.

In the drawing:

Figure 1 is a plan view of a cultivator constructed in accordance with my invention;

Fig. 2 is a side elevation of the same with the near wheel removed;

Fig. 3 is a bottom plan view;

Fig. 4 is a rear elevation;

Fig. 5 is a horizontal sectional view on line 5—5 of Fig. 4;

Fig. 6 is a fragmental vertical sectional view on line 6—6 of Fig. 1 showing the manner in which the controlling levers are connected to the shovel frame;

Fig. 7 is a detail of one of the pedal levers, and

Fig. 8 is a fragmental longitudinal sectional view looking at one of the shovel frames.

Fig. 9 is a fragmentary perspective view of one of the pedal levers and the spring tensioning means.

The embodiment of the invention illustrated in the drawing includes an arched axle 1 from which a tongue 2 extends, which axle is supported by suitable wheels 3. Extending transversely of the tongue 2 is a bar 4 from which a pair of arms 5 depend. Carried by these arms 5 are bolts 6, to the extended ends of which clevises 7 are connected. Links 8 extend upwardly from these clevises and are connected to a whiffle tree 9. Swingle trees 10 are pivoted on the links 8 between their ends. By this arrangement a direct pull is transmitted to the tongue 2 and also to the lower ends of the arms 5 and consequently to the shovel carrying frames which will later be described.

Blocks 11 are pivotally mounted on the bolts 6 and carry, pivotally, ears 12 between which the shovel carrying frames are pivoted. Each of these frames includes an intermediate bar 13 and a pair of diverging bars 14, each of which last mentioned bars is provided with a downwardly extending shovel carrying standard 15. Secured to the outer face of the endmost of the bars 14 are guides 16 which extend longitudinally of the bar.

In order that the shovel carrying frames may be raised and lowered, independently, I have provided a pair of controlling levers 17 which are pivoted, at 18, adjacent to the operator's seat 19. Depending from each of these levers is a link 20 which carries, at its lower end, a roller 21. Secured to each of the shovel carrying frames by a screw 22 is a rod 23 which extends upwardly from this point 22 and is bent transversely to form a loop 24, in which loop the adjacent roller 21 operates from end to end. The rod is thence bent rearwardly and downwardly and is attached, at 25, to the outermost end bar of each frame. Secured to the intermediate bar of each shovel carrying frame is a guide rod 26 which extends in diverging relation to the adjacent rod 23. Thus, by means of the levers 17, the shovel carrying frames may be raised and lowered and may be swung about their pivots to and away from each other, the pivotal movement being permitted by the riding of the rollers 21 in the loops 24.

In order that the adjustment of the frames to and away from each other may be effected, I have mounted on each of the vertical portions of the arched axle 1, a substantially L-shaped guide rod 27 which extends below the lowermost portion of said axle. On each of these guide rods a pedal lever is pivotally mounted, and each of these levers is constructed of a plurality of sections 28 and 29, the latter being adjustable on the former and held in its adjusted positions by means of a screw 30 which passes through a slot in the section 29 and engages the section 28. Adjustably secured to these sections 29 are foot members 31. Mounted on the lower face of each of the sections 28 is a block 32 which carries on one end a roller 33, which roller operates against a diagonally disposed bar 34 which is secured to the adjacent shovel carrying frame. The thickness of the bar 34 is substantially equal to the thickness of the block 32 so that when the lever is moved pivotally the sections 28 and 29 will pass over the adjacent bar 34. These levers are guided in their movement by the guides 26 which have their ends secured to the intermediate bars 13 and between which and said bars the levers are movable. The riding of the rollers 33 on the diagonally extending bars 34 causes the shovel carrying frames to move pivotally to and away from each other so that relation to the rows of plants may be varied independently and at will.

In order that these shovel carrying frames may be kept in a normally separated position, I have secured to the lower face of each of the frames blocks 35 to each of which block a spring 36 is adjustably attached by means of a tensioning screw 37. The other ends of these springs are attached to and slidable on the rods 27, these rods being guided in their movement by links 38 which depend from the sections 28 of the pedal lever.

In operation when it is desired to raise or lower either or both of the shovel carrying frames it may be accomplished by the operation of the levers 17 and when it is desired to move one or both of the shovel carrying frames toward the center of the cultivator this may be accomplished by the movement of the pedal levers and immediately upon the release of the pressure from said levers the springs 36 will return the frame and consequently the levers to their normal or initial positions.

While I have illustrated and described a particular embodiment of my invention, it has merely been for the sake of convenience and I do not wish to be limited to that particular embodiment as it is obvious that numerous changes may be made within the scope of the appended claims.

What I claim is:—

1. In a cultivator, the combination with an axle and a tongue extending therefrom; of arms depending from said tongue, shovel frames carried by said arms for horizontal and vertical pivotal movement and including an intermediate and diverging end bars, levers carried by said axle for effecting said vertical movement, guiding means carried by said intermediate bar, pedal means engaging said guiding means for effecting the horizontal movement in one direction, and resilient means for effecting horizontal movement in the opposite direction.

2. In a cultivator, the combination with a wheel supported axle and a tongue extending therefrom; of a horizontally and vertically pivoted shovel carrying frame including diverging bars, a rod having one end secured to the forward portion of said frame and having a loop intermediate its ends extending transversely of the frame, the other end of said rod being secured to the rear end of one of said diverging bars, a lever carried by said axle and having a sliding connection with said loop, and pedal operated means for moving the frame on its vertical pivot.

3. In a cultivator, the combination with a wheel supported axle and a tongue extending therefrom; of a horizontally and vertically pivoted shovel carrying frame including diverging bars, a rod having one end secured to the forward portion of said frame and having a loop intermediate its ends extending transversely of the frame, the other end of said rod being secured to the rear end of one of said diverging bars, a lever carried by said axle and having a sliding connection with said loop, pedal operated means for moving the frame on its vertical pivot, and resilient means for moving the frame horizontally in one direction.

4. In a cultivator, the combination with a wheel supported axle and a tongue extending therefrom, of a shovel carrying frame connected to said axle and movable horizontally and vertically, means for effecting the vertical movement of the frame and means for effecting the horizontal movement in one direction, which means includes a rod carried by the adjacent portion of the axle, a bar extending obliquely with relation to the frame and a pedal lever slidably and pivotally mounted on the rod and having a roller contacting with the said bar.

5. In a cultivator, the combination with a wheel supported axle and a tongue extending therefrom, of a shovel carrying frame connected to said axle and movable horizontally and vertically, means for effecting the vertical movement of the frame, means for effecting the horizontal movement in one direction, which means includes a rod carried by the adjacent portion of the axle, a bar extending obliquely with relation to the frame, a pedal lever slidably and pivotally mounted on the rod and having a roller contacting with the said bar, and resilient means for moving the frame horizontally in one direction and for maintaining the bar constantly in contact with the roller.

In testimony whereof, I affix my signature, in the presence of two witnesses.

DELBERT ELLIOTT.

Witnesses:
LENA M. REYNOLDS,
EARL HAYES.

Copies of this patent may be obtained for five cents each, by addressing the "Commissioner of Patents, Washington, D. C."